M. SMOLENSKY.
SAFETY VALVE.
APPLICATION FILED MAY 15, 1918. RENEWED MAY 7, 1919.

1,322,638.                                      Patented Nov. 25, 1919.

M. Smolensky
Inventor

By John A. Bommhardt
Attorney

UNITED STATES PATENT OFFICE.

MICHAEL SMOLENSKY, OF CLEVELAND, OHIO.

SAFETY-VALVE.

1,322,638.  Specification of Letters Patent.  Patented Nov. 25, 1919.

Application filed May 15, 1918, Serial No. 234,699.  Renewed May 7, 1919.  Serial No. 295,454.

*To all whom it may concern:*

Be it known that I, MICHAEL SMOLENSKY, a subject of Austria-Hungary, residing at Cleveland, in the county of Cuyahoga and State of Ohio, have invented certain new and useful Improvements in Safety-Valves, of which the following is a specification.

This invention relates to safety valves of the pop type, having a valve which is held closed by a spring which is compressed by the lift of the valve under excess pressure, the tension of the spring being adjustable by means of a nut which confines the same.

A feature of the invention is an improved valve construction permitting flow through the same, in combination with guides on the valve casing and a hollow pressure nut through which the fluid passes when the valve lifts.

The invention is illustrated in the accompanying drawings in which—

Figure 1:
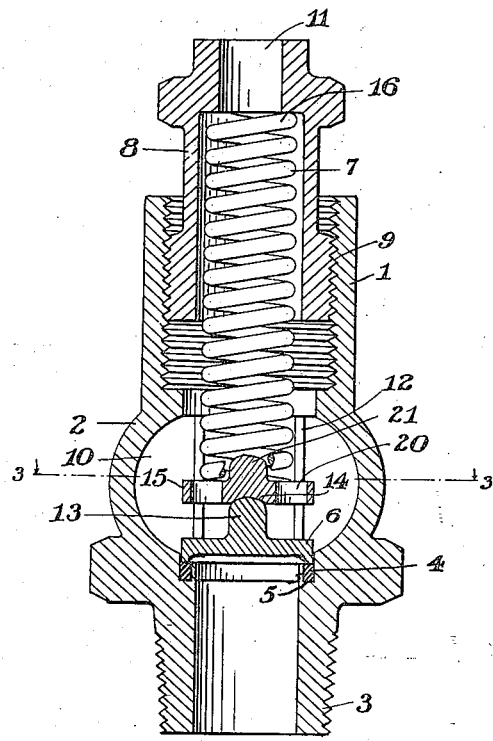
Figure 1 is a central longitudinal section of the valve.
Figure 2:
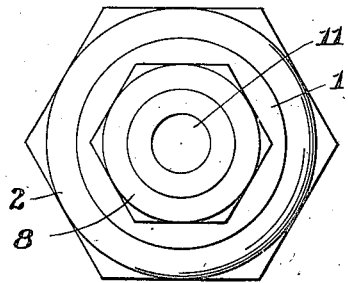
Fig. 2 is a top view thereof.
Figure 3:
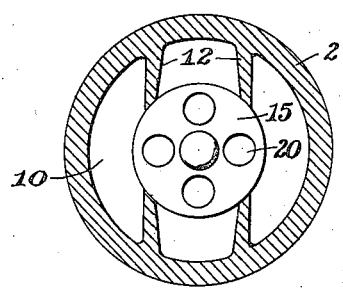
Fig. 3 is a section on the line 3—3 of Fig. 1.

Referring specifically to the drawings, 1 indicates a hollow valve casing or plug, the inner end of which is threaded externally as indicated at 3, to screw into a boiler or other body. This casing has an intermediate globular body 2, and its outer end is internally threaded as shown at 9 to receive the hollow threaded nut or sleeve 8 which confines the spring 7. The inner wall of the globular part 2 has a set of longitudinal ribs or guides 12 for the valve and a seat ring 4 resting against the shoulder 5. The valve comprises a disk 6 which has a central circular stud 13 on the back thereof. This stud fits in a depression 14 in an upper disk 15 which is provided with holes 20 and also has a lug 21 on the top thereof. The valve disk 6 and the upper disk 15 are confined by the guides 12, and the spring 7 presses against the disk 15. The connection between the two disks produced by the stud 13 permits the lower or valve disk 6 to rock or tilt to a certain extent, so that it seats closely under all conditions. The openings 20 permit the flow of liquid through the upper disk, in addition to the space 10. The valve closes against the seat 4 and is held closed by the pressure of the spring 7, one end of which is confined by a shoulder 16 in the tubular nut 8, the outlet opening 11 of which permits the escape of fluid when the valve opens. The valve slides in the tubular part of the casing, being confined by the guides 12. In use, the nut 8 is adjusted for the desired pressure, and when this is exceeded, the valve lifts, and the fluid will escape around the valve seat, and into the space 10 and thence out through the tubular nut, until the excess pressure is relieved, when the spring will reseat the valve.

A feature of the invention is the simplicity and cheapness of construction, and the ease with which the parts can be removed and replaced.

I claim:

A safety valve comprising a tube having an intermediate globular body having longitudinal guide ribs, a hollow threaded sleeve nut screwed into the outer end of the tube, a valve seat in the body at the inner end of said ribs, a disk coöperating with said seat, said disk having a projecting stud on the back thereof, an upper disk resting upon said stud, said disks being confined by said ribs, and a spring seated in the hollow of the sleeve nut and bearing against said upper disk, the sleeve nut being adjustable to vary the tension of the spring and also forming the outlet from the valve.

In testimony whereof I do affix my signature in presence of two witnesses.

MICHAEL SMOLENSKY.

Witnesses:
JOHN A. BOMMHARDT,
EDWARD I. HOBDAY.